UNITED STATES PATENT OFFICE.

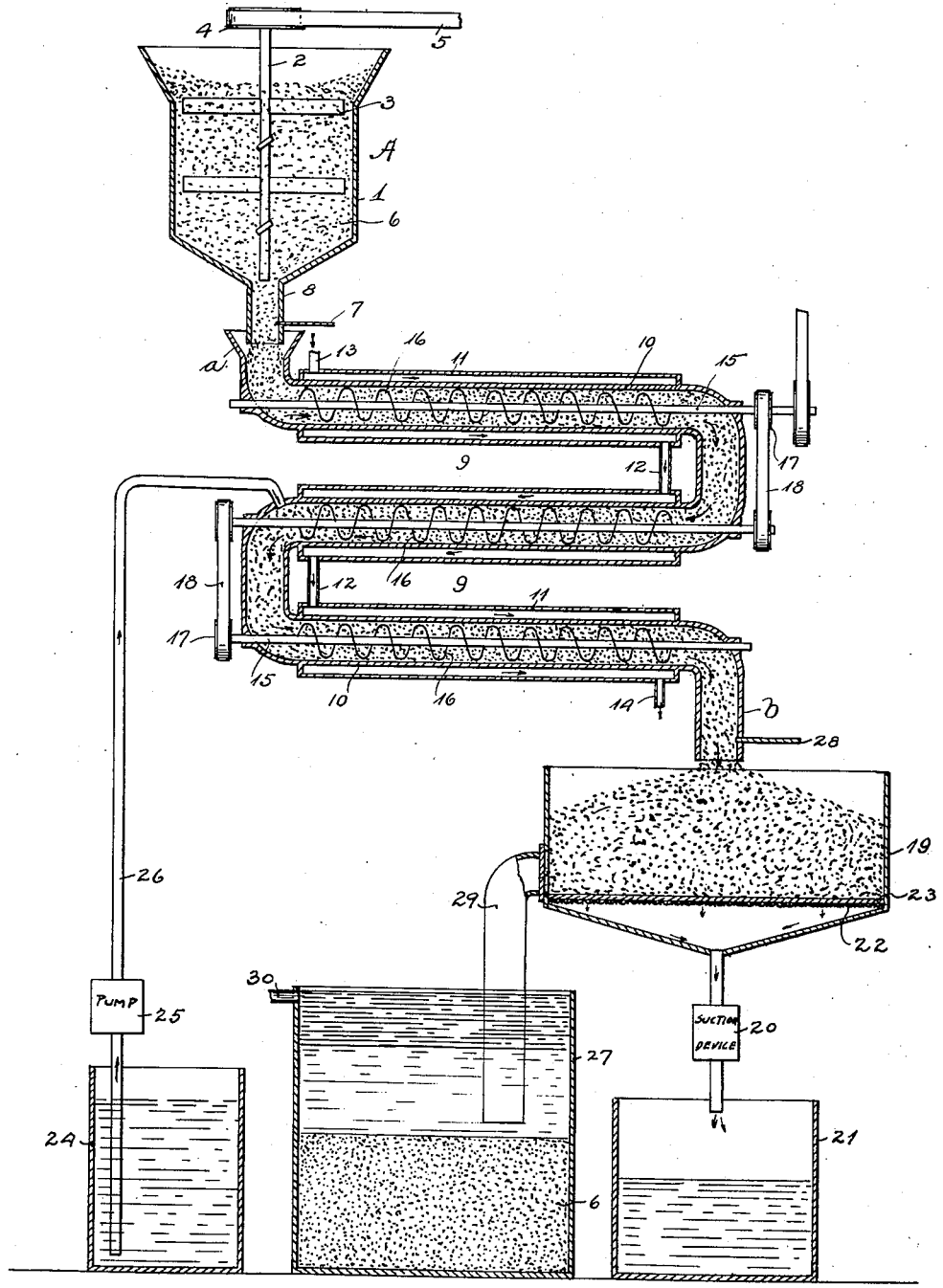

RUDOLPH R. ROSENBAUM, OF CHICAGO, ILLINOIS.

PROCESS FOR SEPARATING HYDROCARBONS.

1,278,023.  Specification of Letters Patent.  Patented Sept. 3, 1918.

Application filed December 13, 1917. Serial No. 206,933.

*To all whom it may concern:*

Be it known that I, RUDOLPH R. ROSENBAUM, a citizen of the United States, and a resident of Chicago, in the county of Cook and State of Illinois, have invented certain new and useful Improvements in Processes for Separating Hydrocarbons, of which the following is a specification.

My invention relates to an improved process for separating hydrocarbons and is particularly adaptable for obtaining heavier hydrocarbons such as paraffin and asphalt from crude petroleum.

In crude oils, the paraffin contained is non-crystallizable. In prior art processes attempts have been made to separate out this non-crystallizable paraffin by mixing distillation residue with gasolene, chilling the residue, and then effecting separation by gravity. But even with such process it is impossible to get rid of all of the oil, the product being a mixture of non-crystallizable paraffin and heavy oil, known to the trade as vaseline. Where the residue treated is from a crude oil containing asphalt it is impossible with prior processes to get rid of the asphalt.

Crystalline paraffin, that is, paraffin wax, has been obtained in the art by distillation of crude oil far enough to carry over paraffin, this paraffin being crystallizable. However, such paraffin will be impure on account of oil which is carried over therewith during the distillation process. By running the obtained crystalline paraffin with its oil content through a filter press some of the oil can be removed, and more oil can be removed by the sweating process. However, it has been impossible to remove all of the oil.

It has also been impossible to obtain pure asphalt from crude oils on account of the heavier liquid hydrocarbons remaining in the asphalt.

By means of my improved process I am enabled to obtain pure asphalt from crude oils, and to obtain pure non-crystallizable paraffin from crude oils irrespective of asphalt content. I am also enabled by my improved process to obtain a greater quantity of crystallizable paraffin or paraffin wax.

I have found that by cooling a non-crystallizable paraffin containing residue or a paraffin distillate to cause congealing or solidification of the paraffin, the oil can readily be removed therefrom by means of solvents which will not attack the congealed or solidified paraffin, and that by means of suitable solvents which will not attack the chilled paraffin, the bitumen or asphalt can be removed from a distillation residue. I have also found that the separation is more thorough if the hydrocarbon mixture to be separated presents a large surface to the cooling medium and to the solvents. This can readily be accomplished by first heating the material to be separated to melt the solids and semi-solids and then thoroughly mixing the melted substance with some porous material which will absorb the melted substance. I have found that fullers'-earth is very suitable as it will absorb about 70% of its bulk of the melted substance. If it is desired to obtain non-crystallizable paraffin from a distillation residue, this residue is heated and mixed with the absorbent material and the mixture is then forced through a duct and thoroughly agitated to bring the mixture against the duct walls which I surround by a jacket through which cooling medium, such as cold brine, is circulated. This cooling will congeal the paraffin, and I then bring a solvent, such as cold gasolene, into intimate contact with the mixture, such cold gasolene dissolving the oil but not attacking paraffin. This solvent can be passed through the duct into intimate engagement with the mixture during its travel and agitation therethrough. The chilled mass together with the oil and its solvent are then separated in some suitable manner. I have accomplished such separation by discharging the entire mixture into a filter apparatus which will draw out the gasolene and oil solution but which will leave the chilled paraffin in the porous material. This porous material with the chilled paraffin therein is discharged into a vat and treated with hot water which will melt the paraffin, the paraffin floating to the top of the water to be skimmed off, and the porous material falling to the bottom of the vat. If the distillation residue contains asphalt, it is first heated and mixed with the porous material and then cooled. Then, if oil is present, cold benzene is applied which will dissolve both the oil and the asphalt, or cold gasolene can first be applied to take out only the oil and then cold benzene applied to take out the asphalt.

If a paraffin wax distillate is to be cleaned from its oil content it is subjected to the same treatment as the residue containing non-crystallizable paraffin, cold gasolene dissolving the oil but not the wax.

On the accompanying drawing the figure shows simple apparatus for carrying out my process, it being understood, of course, that apparatus different from that shown can be used for carrying out the various steps and processes.

Referring to the drawing, A represents a suitable mixing device comprising a container 1, a shaft 2 with mixing blades 3 thereon and a driving pulley 4 on the shaft connected by a belt 5 with a suitable driving source (not shown). The substance to be treated is first heated to liquid form and is poured into the container 1 to be absorbed by absorbent material 6, such as fullers'-earth, the hot substance and absorbent material being thoroughly mixed together by the propeller blades, a closure 7 being preferably provided for closing the outlet 8 of the container 1 during the mixing operation. After the porous material has fully absorbed the hot substance to be treated the closure 7 is opened and the mixture flows into the upper end of a sinuous duct 9 whose sections 10 are surrounded by jackets 11 which are connected together by pipes 12 in such manner that cooling fluid may be circulated therethrough around the duct sections. The cooling fluid preferably enters through the inlet pipe 13 and leaves through the outlet pipe 14. Extending axially through each of the sections 10 is a shaft 15 supporting within the section a propulsion screw or helical blade 16. The shafts are connected serially together by means of pulleys 17 and belts 18, the arrangement of the propelling screws and belts being such that the screws will force the material serially through the duct from its entrance end $a$ to its outlet end $b$. Below the outlet end $b$ I have shown a tank 19 whose lower end is contracted into funnel shape and which is preferably connected with a suction device 20 which discharges into a tank 21. Extending across the lower part of the tank 19 is a screen 22 on which is supported suitable filter material 23.

24 represents a tank for containing the solvent which is to be used for dissolving out the oil or asphalt from the substance passing through the ducts, a pump 25 being provided for forcing the solvent through the pipe 26 into the duct. 27 represents a tank for containing hot water.

Suppose now that it is desired to extract non-crystallizable paraffin from the residue of a distillation process after the lighter oils have been driven off. This residue is first thoroughly heated to a thin liquid and poured into the container 1 to be thoroughly absorbed by and mixed with the fullers'-earth or other absorbent material when the mixing blades are driven. After such thorough mixture the closure 7 is opened and the contents discharged from the container 1 into the end $a$ of the duct 9. The propulsion screws 16 being rotated, the material is forced serially through the duct, the screws thoroughly agitating the material and bringing it repeatedly against the cold walls of the duct so that the paraffin quickly becomes chilled and congealed, the oil remaining in fluid form. In this case the solvent will be cold gasolene or other solvent which will dissolve the oil but not the cold paraffin. This solvent is pumped from the tank 24 and discharged into the duct at a point where the paraffin has already become sufficiently chilled to resist the solvent. The solvent then flows through the duct together with the material carried by the absorbent material and during violent agitation of such material the solvent becomes intimately mixed with the oil and the oil is all dissolved. The entire mixture then flows from the outlet $b$ of the duct into the tank 19, the solution of the gasolene and oil flowing readily through the filter material and screen to the tank 21, the suction device 20 serving to draw out all of the solution from the porous material and leaving only the chilled paraffin in such material. A closure member 28 is provided for the outlet $b$ and the duct 9 can be closed after the tank 19 has been filled. After removal of the oil and gasolene from the tank 19 the porous material with its paraffin content is discharged through the pipe 29 into the hot water tank 27. The hot water will melt the paraffin out of the porous material, and such paraffin being lighter than the water will flow to the top and through the outlet 30 into a suitable receptacle. The cleaned porous material will settle to the bottom of the tank 27 from where it can be readily removed and dried. The solution of gasolene and oil in the tank 21 can then be subjected to an evaporating and condensing process to separate the gasolene and oil.

If the substance to be treated is a paraffin wax distillate containing oil, the same process is carried out, the solvent such as cold gasolene taking out the oil but not the wax. The porous material with its cold wax content is discharged from the tank 19 into the hot water tank, the paraffin wax floating to the top and the porous material settling at the bottom of the tank.

If the substance, such as a distillation residue, contains bitumen or asphalt it is heated and mixed with the porous material and agitated in contact with the cooling surfaces and then a solvent, such as cold benzene, is applied to take out the asphalt and to leave the paraffin in the porous material. If the substance also contains oil, then, after mixing with the porous material and cooling under agitation, a solvent such as cold gasolene can be applied to dissolve out only the oil. Then a solvent such as cold benzene is applied which will take out the asphalt, leaving the paraffin in the porous material. Or, cold benzene could be immediately applied to the cooled substance to dissolve out both the oil and the asphalt and then the asphalt and oil separated, as for example by evaporating or distilling off the benzene from the solution and then applying cold gasolene to dissolve out the oil. Thus by the application of suitable solvents hydrocarbons can be selectively dissolved out of a mass to be separated and the obtained products will be entirely pure.

I do not desire to be limited to the precise construction, arrangement and operation shown and described as changes and modifications are no doubt possible which would still come within the scope of the invention.

I claim as follows:

1. The process for obtaining paraffin from the residue of the distillation of crude oil containing the paraffin which consists in heating the residue, then thoroughly mixing it with comminuted absorbent material to give a large exposure surface to the residue, then forcing the mixture of porous material and residue under agitation in contact with cooling surfaces to cause congealing and hardening of the paraffin content, applying to the cooled mass a solvent which will not dissolve the paraffin but will dissolve the other hydrocarbons of the residue, then separating the solution from the mass to leave the porous material with the paraffin therein, and then separating the paraffin from the porous material.

2. The process of obtaining paraffin from a paraffin and oil residue resulting from the distillation of crude oil which consists in heating the residue to melt the paraffin content, mixing the heated residue with comminuted porous material to give the residue a large exposure surface, then subjecting the porous material with the residue therein to a low temperature and under agitation to chill and harden the paraffin content, then applying to the cooled substance a solvent which will dissolve the oil but not the paraffin, then drawing off the oil and solvent to leave the porous material with only the paraffin therein, and then treating the porous material with hot water to melt out and remove the paraffin therefrom.

3. The process of obtaining pure asphalt from a hydrocarbon mass which consists in heating the mass and thoroughly mixing it with comminuted absorbent material, then agitating the cooled mass and bringing it into intimate contact with cooling surfaces to cause congealing of the paraffin content, then applying to the mass a solvent which will dissolve out the asphalt, and then separating the asphalt from its solvent.

4. The process of obtaining a certain desired hydrocarbon from the residue of the distillation of crude oil containing such hydrocarbon, which consists in liquefying said residue, thoroughly mixing it with absorbent material, then applying a solvent which will not attack the desired hydrocarbon but will dissolve the other hydrocarbons, then separating the solution from the mass, and then separating the desired hydrocarbon from the absorbent material.

In witness whereof I hereunto subscribe my name this 10th day of December, A. D. 1917.

RUDOLPH R. ROSENBAUM.